(12) United States Patent
Tanaka

(10) Patent No.: US 11,628,710 B2
(45) Date of Patent: Apr. 18, 2023

(54) LIGHT CONTROL SYSTEM FOR WINDSHIELD

(71) Applicant: Toyota Jidosha Kabushiki Kaisha, Toyota (JP)

(72) Inventor: Ryusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 17/022,463

(22) Filed: Sep. 16, 2020

(65) Prior Publication Data

US 2021/0101454 A1 Apr. 8, 2021

(30) Foreign Application Priority Data

Oct. 4, 2019 (JP) .............................. JP2019-184042

(51) Int. Cl.
*B60J 3/04* (2006.01)
*G02F 1/13* (2006.01)
*G02F 1/133* (2006.01)
*G02F 1/157* (2006.01)
*G02F 1/163* (2006.01)
*B60J 1/02* (2006.01)

(52) U.S. Cl.
CPC .............. *B60J 3/04* (2013.01); *G02F 1/1313* (2013.01); *G02F 1/13306* (2013.01); *G02F 1/157* (2013.01); *G02F 1/163* (2013.01); *B60J 1/02* (2013.01)

(58) Field of Classification Search
CPC ........................................................ B60J 3/04
See application file for complete search history.

(56) References Cited

U.S. PATENT DOCUMENTS

| | | | |
|---|---|---|---|
| 10,319,272 B1* | 6/2019 | Carter | ........................ B60J 3/04 |
| 2006/0158715 A1 | 7/2006 | Furusawa et al. | |
| 2016/0039271 A1* | 2/2016 | Okamoto | ................. B60J 1/002 |
| | | | 296/96.19 |
| 2016/0318379 A1 | 11/2016 | Okuda et al. | |
| 2016/0357014 A1 | 12/2016 | Beckman | |
| 2018/0001843 A1 | 1/2018 | Bowers | |

(Continued)

FOREIGN PATENT DOCUMENTS

| | | |
|---|---|---|
| DE | 102012108555 B3 | 2/2014 |
| DE | 202019100577 U1 | 3/2019 |

(Continued)

*Primary Examiner* — Jessica M Merlin
(74) *Attorney, Agent, or Firm* — Dinsmore & Shohl LLP

(57) ABSTRACT

A light control system for a windshield can change a visible light transmittance of an upper part and a non-upper part of each of a front windshield, a right side windshield, and a left side windshield. A controller that controls a change includes a mode changing unit that changes a mode depending on whether a vehicle is not in a driving state or in a driving state. When the vehicle is not in a driving state, a change of reducing the visible light transmittance of the upper part and the non-upper part to be lower than a predetermined value is permitted. When the vehicle is in a driving state, a change of reducing the visible light transmittance of the upper part to be lower than the predetermined value is permitted and a change of reducing the visible light transmittance of the non-upper part to be lower than the predetermined value is prohibited.

9 Claims, 10 Drawing Sheets

(56) References Cited

U.S. PATENT DOCUMENTS

2019/0225156 A1    7/2019  Sasaki et al.
2019/0366811 A1*   12/2019 O'Keeffe ............. G06V 20/597

FOREIGN PATENT DOCUMENTS

| | | | |
|---|---|---|---|
| JP | S60-158209 U | | 10/1985 |
| JP | S060158209 U | * | 10/1985 |
| JP | 2006-199104 A | | 8/2006 |
| JP | 2009-241807 A | | 10/2009 |
| JP | 2009241807 A | * | 10/2009 |
| JP | 2017-159730 A | | 9/2017 |
| JP | 2018-509345 A | | 4/2018 |
| JP | 2018-130981 A | | 8/2018 |
| JP | 2019-127154 A | | 8/2019 |
| WO | 2015098312 A1 | | 7/2015 |

* cited by examiner

LIGHT CONTROL SYSTEM FOR WINDSHIELD

CROSS REFERENCE TO RELATED APPLICATION

This application claims priority to Japanese Patent Application No. 2019-184042 filed on Oct. 4, 2019, which is incorporated herein by reference in its entirety including the specification, claims, drawings, and abstract.

TECHNICAL FIELD

The present disclosure relates to a light control system for a windshield mounted on a vehicle.

BACKGROUND

In some cases, a member such as a light control glass panel for which the visible light transmittance can be changed is used for a windshield of a vehicle.

JP 2017-159730 A describes that the lower end of a low-transmission area in the upper part of a front windshield is moved in response to an instruction from a user so as to change the height of the low-transmission area.

JP 2009-241807 A describes a configuration of detecting a touch from a user's finger or the like on a windshield and then changing the visible light transmittance at the touched position, thereby increasing the range of available light control. It is also described that the user can touch the windshield when the vehicle is not moving to reduce the transmittance of the entire windshield to zero.

SUMMARY

When driving, the windshield of a vehicle must transmit sufficient light to ensure a field of view. On the other hand, when the vehicle is not move, it may desirable to, for example, block direct sunlight from the windshield to prevent the temperature rise inside the vehicle for the convenience of the operator and occupants.

JP 2017-159730 A noted above does not describe light control when a vehicle is not moving. While JP 2009-241807 A not above does describe light control when a vehicle is not moving, a sufficient field of view may not be secured during driving due to the high degree of freedom of light control.

An object of the present disclosure is to provide a highly convenient windshield that provides a secure field of view and achieves a light-shielding property during driving and also achieves the light-shielding property when a vehicle is not being driven.

A light control system for a windshield according to the present disclosure includes a windshield of a vehicle, the windshield being capable of changing the visible light transmittance of an upper part and a non-upper part and a controller that controls a change of the visible light transmittance, wherein when the vehicle is not in a driving state, the controller permits a change of reducing the visible light transmittance of the upper part and the non-upper part to be lower than a predetermined value, and when the vehicle is in a driving state, the controller permits a change of reducing the visible light transmittance of the upper part to be lower than the predetermined value and prohibits a change of reducing the visible light transmittance of the non-upper part to be lower than the predetermined value.

In an aspect of the light control system for a windshield according to the present disclosure, when the vehicle is not in a driving state, the controller controls the visible light transmittance of the upper part to be freely selectable in a first changeable range that is set in advance and includes a visible light transmittance lower than the predetermined value, and controls the visible light transmittance of the non-upper part to be freely selectable in a second changeable range that is set in advance and includes a visible light transmittance lower than the predetermined value, and when the vehicle is in a driving state, the controller controls the visible light transmittance of the upper part to be freely selectable in the first changeable range, and controls the visible light transmittance of the non-upper part to be selectable only in a range having a visible light transmittance equal to or higher than the predetermined value within the second changeable range.

In an aspect of the light control system for a windshield according to the present disclosure, the windshield is a front windshield disposed at the front of the vehicle, and the upper part is set to be outside a range of a field of view necessary for a driver of the vehicle to ascertain a traffic condition.

In an aspect of the light control system for a windshield according to the present disclosure, the upper part is set as an area within 20% of a height of the front windshield.

In an aspect of the light control system for a windshield according to the present disclosure, the predetermined value is set in a range in which the visible light transmittance is equal to or higher than 70%.

In an aspect of the light control system for a windshield according to the present disclosure, an instance wherein the vehicle is not in a driving state includes a state wherein an ignition switch or a power switch that activates the vehicle is turned off. In an aspect of the light control system for a windshield according to the present disclosure, the vehicle is capable of traveling in an automatic driving mode, an instance wherein the vehicle is in a driving state includes a state wherein the vehicle is traveling in a non-automatic driving mode, and an instance wherein the vehicle is not in a driving state includes a state wherein the vehicle is traveling in the automatic driving mode.

In an aspect of the light control system for a windshield according to the present disclosure, the controller includes a storage unit having a plurality of pieces of light control data, detects a number of times that a single light control switch is operated by a user, reads the light control data from the storage unit, and changes the visible light transmittance in the upper part and the non-upper part.

According to the present disclosure, it is possible to secure a field of view and a light-shielding property when a vehicle is in a driving state, and also to execute control to improve the light-shielding property when the vehicle is not in a driving state. As a result, highly convenient light control is achieved.

BRIEF DESCRIPTION OF DRAWINGS

Embodiments of the present disclosure will be described based on the following figures, wherein.

DESCRIPTION OF EMBODIMENTS

An embodiment will be described below with reference to the drawings. In the following description, while specific aspects are explained for ease of understanding, these aspects only exemplify the embodiment and various other embodiments may be adopted.

Figure 1:
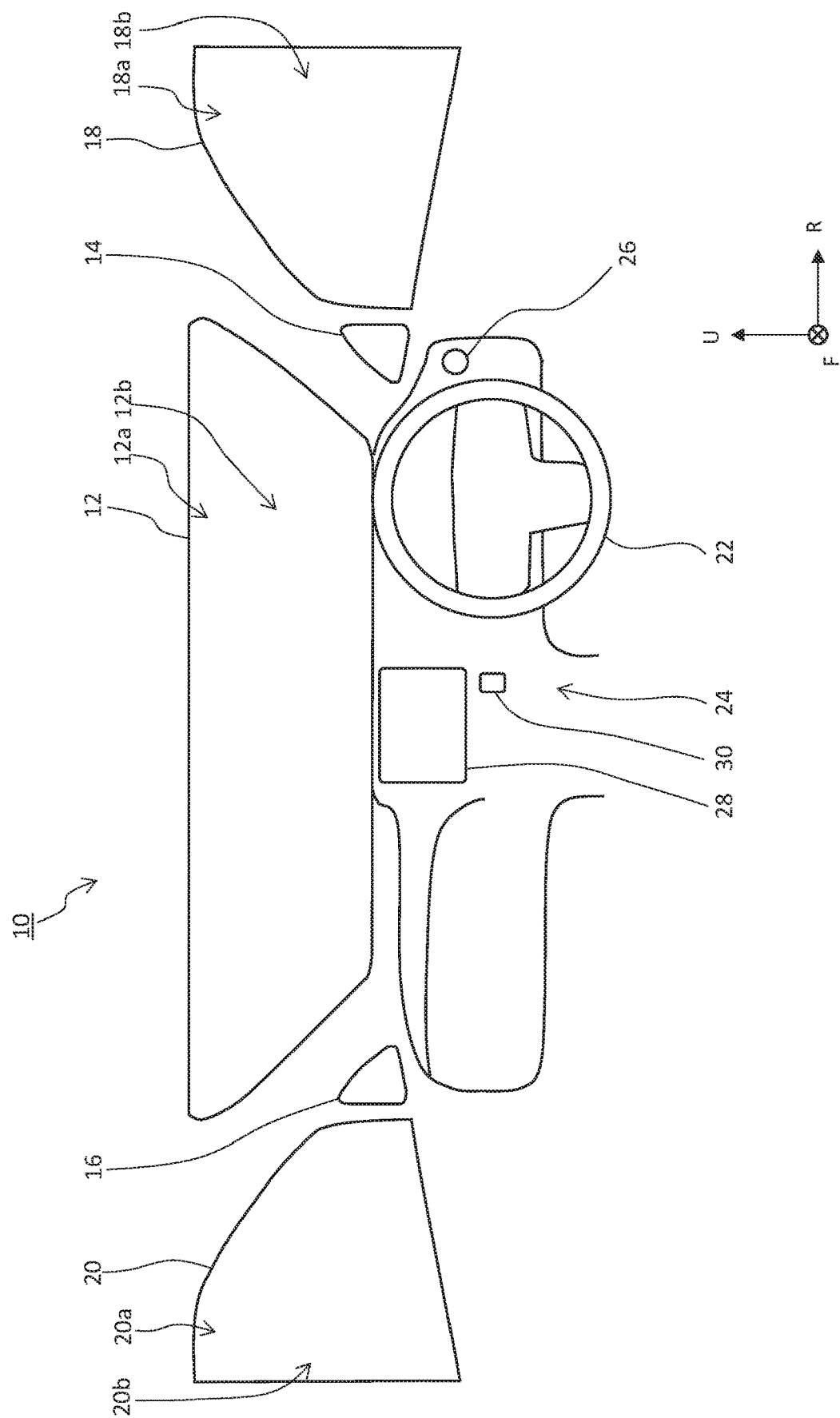
FIG. 1 is a schematic view illustrating a vicinity of a front part of the interior of a vehicle.

FIG. 1 is a schematic view illustrating a part of the interior of a vehicle 10 according to an embodiment. FIG. 1 illustrates a state wherein the front of the vehicle is viewed from the interior of the vehicle. In the coordinate system of FIG. 1, the F axis represents a vehicle front direction, the U axis represents an upward direction, and the R axis represents a right-hand direction of a driver.

FIG. 1 illustrates, among the windows in the vehicle 10, a front windshield 12, a right front triangular window 14, a left front triangular window 16, a right side windshield 18, and a left side windshield 20. The front windshield 12 is disposed on the front of the vehicle and is also referred to as "front window" or "windshield". The right front triangular window 14 and the left front triangular window 16 are small windows disposed on the right and left of the front part of a compartment of the vehicle 10, respectively in order to expand the field of view of the driver.

The right side windshield 18 and the left side windshield 20 are windows disposed on the respective right side and left side doors for the front seats of the vehicle 10. The right side windshield 18 is sometimes referred to as "right side window" or "right side glass", and the left side windshield 20 is sometimes referred to as "left side window" or "left side glass". Although not illustrated in FIG. 1, in most cases, the vehicle 10 also includes a rear side windshield on both sides of a rear seat and a rear windshield on the rear of the vehicle.

The front windshield 12, the right side windshield 18, and the left side windshield 20 are formed of a light control member such as light control glass or light control resin capable of changing a visible light transmittance. Light control is executed in the light control member by introducing a mechanism of changing the visible light transmittance in response to an electric signal applied, such as an electrochromic element or a liquid crystal element. In this embodiment, light control, that is, transmittance control on the front windshield 12, is executed by dividing the front windshield 12 into an upper part 12a including an upper end and a non-upper part 12b that is a part other than the upper part 12a. The upper end means the uppermost part as viewed from the boarding driver. The vertical height of the upper part 12a is set to be, for example, within 20% of the vertical height of the front windshield 12. This configuration is set to secure the breadth of field of view necessary for the driver of the vehicle 10 to ascertain traffic conditions.

Similarly, the transmittance is controlled by dividing the right side windshield 18 into an upper part 18a and a non-upper part 18b, and the transmittance is controlled by dividing the left side windshield 20 into an upper part 20a and a non-upper part 20b. The lower ends of the upper parts 12a, 18a, and 20a are set to be substantially at the same height level because of securing effective light shielding and uniformity in design (see FIG. 4 and the like). That is, the lower ends of the upper parts 12a, 18a, and 20a are set to be within the range in which, when the vehicle 10 is viewed from the outside with normal attention, the heights of the lower ends of the upper parts 12a, 18a, 20a are at the same level and people do not feel uncomfortable (for example, the difference of the levels is within 1 cm).

Inside the vehicle 10, a steering wheel 22 is disposed in front of the driver's seat. An instrument panel 24 is disposed in front of the steering wheel 22 in a vehicle width direction. A power switch 26 is disposed beside the steering wheel 22 on the instrument panel 24. In this embodiment, it is assumed that the vehicle 10 is an electric vehicle driven by a drive motor. The power switch 26 is a main switch that activates the vehicle 10, for example, causing the drive motor to be drivable. When the vehicle 10 is an engine-powered vehicle, an ignition switch functions as the main switch for activating the vehicle 10 instead of the power switch 26.

A touch panel display 28 is disposed near the center of the instrument panel 24 in the vehicle width direction. The touch panel display 28 is linked with a car navigation system, and not only displays a map but also receives a touch operation input by a user. By switching a screen, the touch panel display 28 can also display accessories of the vehicle 10 and receive instruction to operate the accessories.

A light control switch 30 is disposed below the touch panel display 28 on the instrument panel 24. The light control switch 30 is a switch for changing the light transmittance of the front windshield 12, the right side windshield 18, and the left side windshield 20. It is assumed in this embodiment that a single switch, not a plurality of switches, is used as the light control switch 30. The light control switch 30 is disposed within a field that allows the driver to recognize the light control switch 30 without significantly moving their line of sight from the front. For example, the driver can quickly operate the light control switch 30 without focusing on either the right side windshield 18 or the left side windshield 20.

Figure 2:
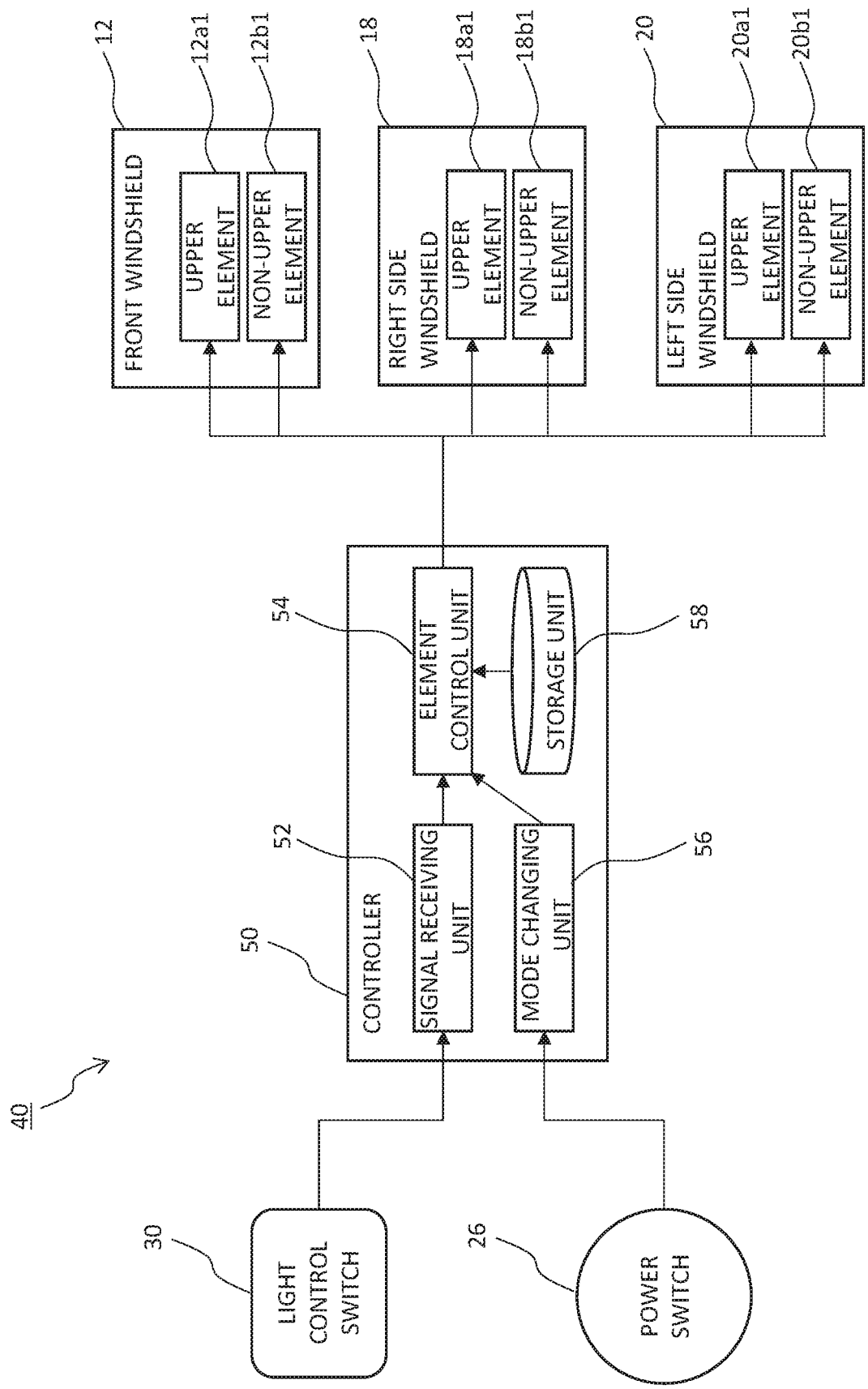
FIG. 2 is a schematic view illustrating a configuration of a light control system for a windshield.

FIG. 2 is a view illustrating a schematic configuration of a light control system 40 for a windshield. The light control system 40 for a windshield is a system for changing the light transmittance of the front windshield 12, the right side windshield 18, and the left side windshield 20. The light control system 40 for a windshield includes the front windshield 12, the right side windshield 18, the left side windshield 20, the light control switch 30, and a controller 50, and its mode is controlled by the power switch 26.

In the front windshield 12, the upper part 12a and the non-upper part 12b respectively include an upper element 12a1 and a non-upper element 12b1 whose transmittances are controlled. Similarly, the right side windshield 18 includes an upper element 18a1 and a non-upper element 18b1, and the left side windshield 20 includes an upper element 20a1 and a non-upper element 20b1. The upper elements 12a1, 18a1, and 20a1 and the non-upper elements 12b1, 18b1, and 20b1 are configured to increase the visible light transmittance when no voltage is applied and, when a voltage is applied, to reduce the visible light transmittance according to the voltage. As such, if a failure occurs in an electric system and the voltage is no longer applied, the transmittance increases and the field of view is thereby reliably secured.

The light control switch 30 is configured as, for example, a mechanical button that moves in a longitudinal direction in response to a pressing operation of a user. By pressing the light control switch 30, an operation signal is transmitted to the controller 50.

The controller 50 is configured using a computer such as an ECU mounted on the vehicle 10. The computer is composed of computer hardware such as a memory and a processor and software such as an operating system (OS) that controls the computer hardware and an application program. In the example illustrated in FIG. 2, the controller 50 includes a signal receiving unit 52, an element control unit 54, a mode changing unit 56, and a storage unit 58.

The signal receiving unit 52 receives an operation signal output from the light control switch 30. The element control unit 54 transmits a control signal to the upper elements 12a1, 18a1, and 20a1 and the non-upper elements 12b1, 18b1, and 20b1 of the windshields based on the operation signal received. The mode changing unit 56 switches between a mode in which the vehicle 10 is not in a driving state and a mode in which the vehicle 10 is in a driving state.

Here, a driving state refers to a state wherein an occupant of the vehicle 10 can visually confirm the environment outside the vehicle from the interior of the vehicle and control the traveling of the vehicle 10 based on a result of the visual confirmation. When the vehicle 10 travels on a road and then temporarily stops at an intersection, it can be said that the vehicle 10 is in a driving state. When the vehicle 10 is an electric vehicle, the state wherein the vehicle power supply is activated and the shift lever is in a range other than a park range can be determined as the vehicle 10 being in a driving state. Further, in an engine vehicle, the state wherein the ignition switch for starting the engine is turned on and the shift lever is in a range other than the park range can be determined as the vehicle being in a driving state. In a hybrid vehicle having both an engine and a motor, the state wherein at least one of the engine and the motor is turned on and the gear selector is in a range other than park can be determined as the vehicle being in a driving state. Moreover, in a vehicle capable of automatic driving, the state wherein the vehicle is activated (vehicle power supply or ignition switch is turned on) and in a non-automatic driving mode (manual driving mode in which occupant manually drives or semi-automatic driving mode in which occupant has to monitor driving and can switch to manual driving at any time) can be determined as the vehicle being in a driving state.

On the other hand, when the vehicle is not in a driving state, the vehicle power supply or the ignition switch is turned off. When the vehicle is an electric vehicle, the state wherein the vehicle power supply is turned on and the shift lever is in the park range or the parking brake is on can be determined that the vehicle is not in a driving state. In an engine vehicle, the state wherein the ignition switch is turned on and the shift lever is in the park range or the parking brake is on can be determined that the vehicle is not in a driving state. In a hybrid vehicle having an engine and a motor mounted thereon, the state wherein at least one of the engine and the motor is turned on and the shift lever is in the park range or the parking brake is on can be determined as the vehicle not being in a driving state. For example, it is effective to operate the light control system 40 for a windshield as described above when it is desired to block the sunlight in the vehicle stopping in a safe place with the engine running.

Moreover, in a vehicle capable of automatic driving, the state wherein the vehicle is activated and is traveling in an automatic driving mode (occupant does not have to monitor driving and vehicle is traveling without occupant visually checking outside vehicle) can be determined as the vehicle not being in a driving state. Automatic driving modes include an autonomous automatic driving mode in which the vehicle 10 is automatically driven by an automatic driving controller in the vehicle 10, a remote monitoring mode in which automatic driving is performed while the vehicle state is monitored from outside the vehicle, and a remote control mode in which automatic driving is performed by controlling the vehicle state outside the vehicle. As it is not necessary for an operator to visually confirm the outside of the vehicle when travelling in the automatic mode, the light control system 40 for a windshield can be effectively operated as described above.

It is assumed in the following embodiment that the vehicle is not traveling in the automatic driving mode and the mode is determined by detecting whether the power switch 26 is on or off. That is, when the power switch 26 is turned off, the mode changing unit 56 switches to a mode in which the vehicle 10 is not in a driving state, and when the power switch 26 is turned on, the mode changing unit 56 switches to a mode in which the vehicle 10 is in a driving state. As described above, it is also possible to execute precise control by monitoring whether or not the shift lever is in the park range or whether or not the parking brake is on. When the vehicle 10 is capable of traveling in the automatic driving mode, for example, the mode changing unit 56 can change modes in cooperation with a switch for switching between the automatic driving mode and the non-automatic driving mode or an automatic driving controller.

When the mode changing unit 56 switches the mode, the control aspect in the element control unit 54 is changed. Specific control aspects will be described below. The storage unit 58 stores light control data necessary for controlling the element control unit 54. The stored data includes a predetermined value (lower limit value and the like) for defining the changeable range of the visible light transmittance.

Even when the power switch 26 is turned off, power is continuously supplied to the light control system 40 for a windshield. Consequently, it is possible to execute light control on the front windshield 12, the right side windshield 18, and the left side windshield 20 when the vehicle is not in a driving state as well as when in a driving state.

Next, an operation of the light control system 40 for a windshield will be described with reference to FIGS. 3 to 7.

Figure 3:
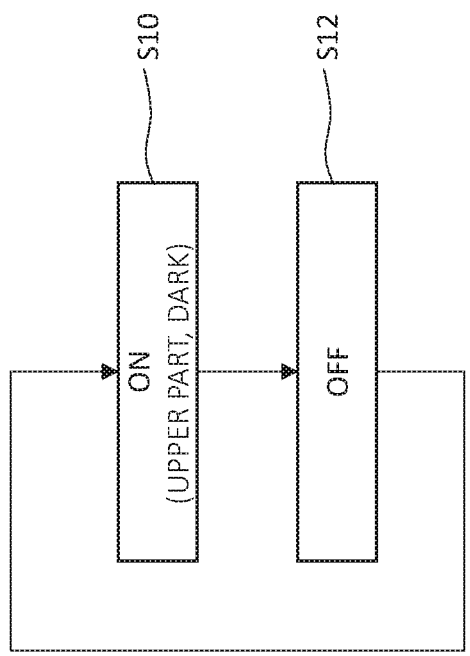
FIG. 3 is a flowchart illustrating an aspect of light control in a driving state.

FIG. 3 is a flowchart illustrating a flow of an operation in a mode in which the vehicle 10 is in a driving state. When the vehicle 10 is in a driving state, "ON (upper part, dark)" (S10) and "OFF" (S12) are repeated each time the light control switch 30 is pressed. At S10, a predetermined voltage is applied to the upper element 12a1 of the front windshield 12, the upper element 18a1 of the right side windshield 18, and the upper element 20a1 of the left side windshield 20. On the other hand, at S12, no voltage is applied to all the elements of the front windshield 12, the right side windshield 18, and the left side windshield 20.

In an "OFF" state (S12), no voltage is applied, and thus the front windshield 12, the entire right side windshield 18, and the left side windshield 20 have high transmittance and become transparent. This corresponds to the state illustrated in FIG. 1.

Figure 4:
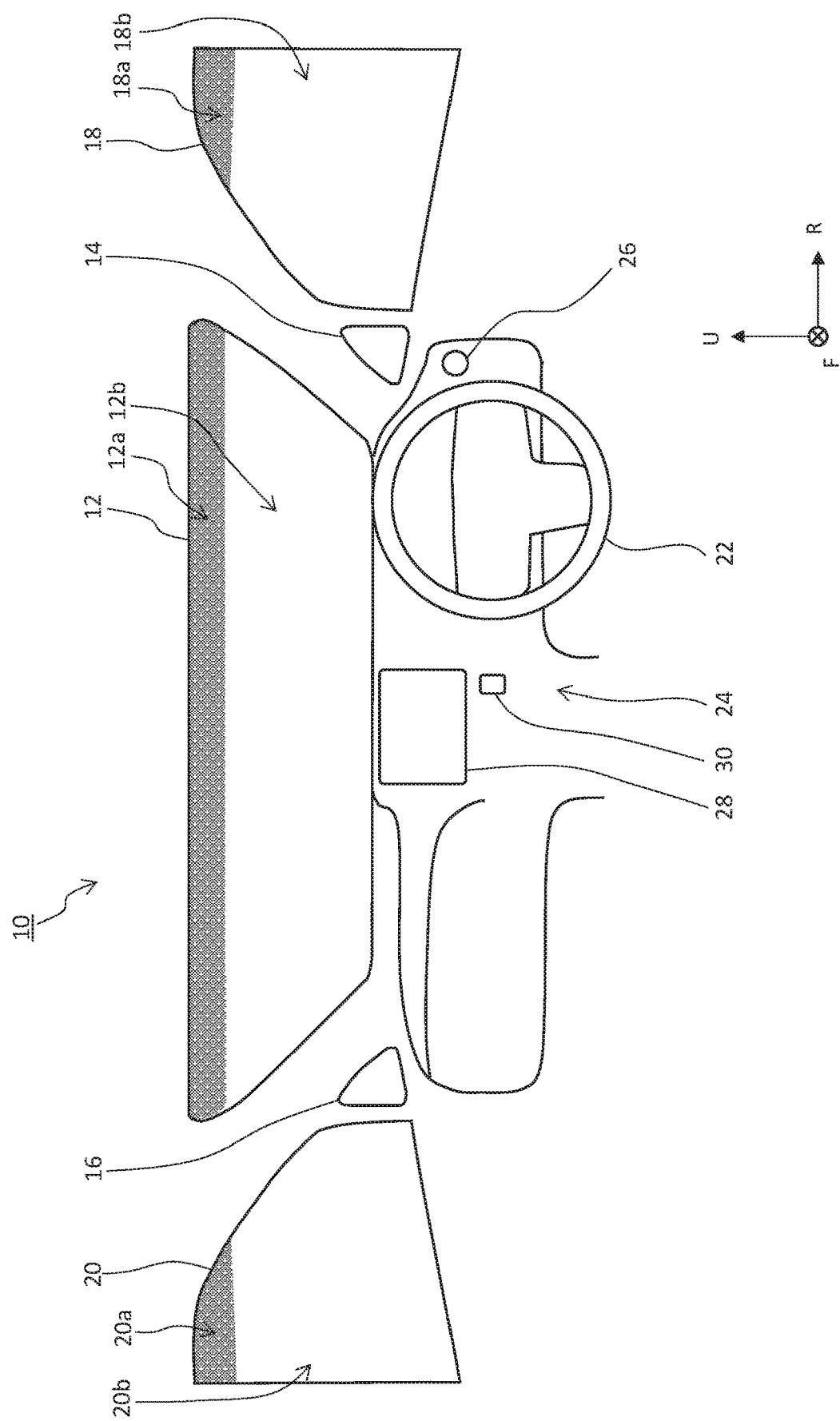
FIG. 4 is a view illustrating a case wherein the transmittance of an upper part is significantly reduced.

FIG. 4 is a view schematically illustrating the "ON (upper part, dark)" state (S10). In FIG. 4, the visible light transmittance in the upper part 12a of the front windshield 12, the upper part 18a of the right side windshield 18, and the upper part 20a of the left side windshield 20 is reduced, and these parts are darkened and in a light shielding state. No voltage is applied to the non-upper parts 12b, 18b, and 20b, and thus high transmittance is maintained in these parts. In the non-upper parts 12b, 18b, and 20b, it is prohibited to change the transmittance to be lower than a predetermined lower limit value (for example, 70%), and control is executed to maintain the transmittance at above the lower limit value. The upper parts 12a, 18a, and 20a can be set to have a transmittance lower than the lower limit value so as to function as a sun visor. As it is permitted to change the transmittance to a value lower than the lower limit value, the transmittance is set to a value lower than the lower limit value noted above, such as, for example, 50% or 30%

A driver typically drives in the "OFF" state (S12) during normal traveling. For example, when the setting sun is too bright, the driver quickly presses the light control switch 30 once to switch to the "ON (upper part, dark)" state (S10). As a result, the light shielding properties of the upper parts 12a, 18a, and 20a are improved, and the possibility that the setting sun may be too bright for the driver can be avoided or reduced. After the sun has set, the driver quickly presses the light control switch 30 once to switch to the "OFF" state (S12). As a result, the transmittance of the upper parts 12a, 18a, and 20a is increased, and the field of view of the driver is expanded.

Figure 5:
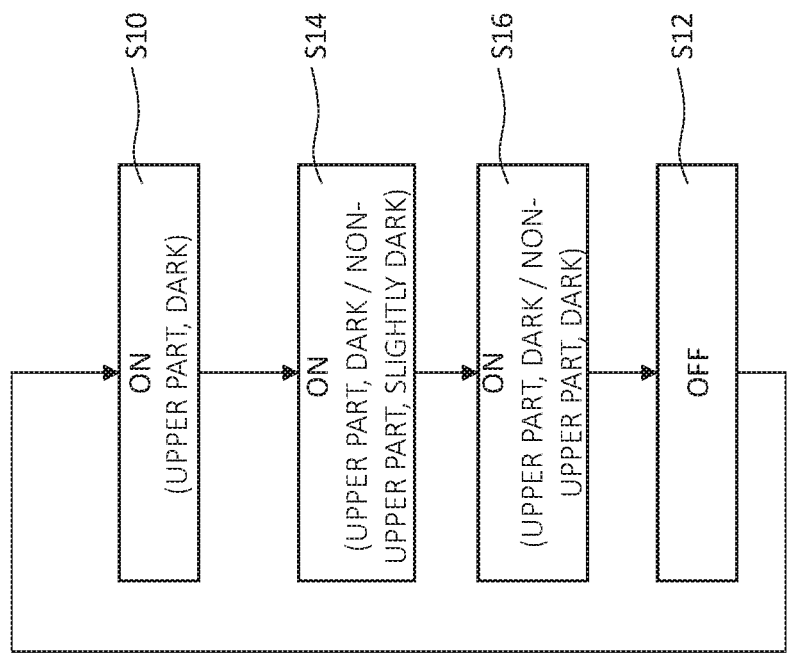
FIG. 5 is a flowchart illustrating an aspect of light control when the vehicle is not in a driving state.

FIG. 5 is a flowchart illustrating a flow of an operation in a mode in which the vehicle 10 is not in a driving state. When the vehicle 10 is not in a driving state, an "ON (upper part, dark)" state (S10), an "ON (upper part, dark/non-upper part, slightly dark)" state (S14), an "ON (upper part, dark/non-upper part, dark)" state (S16), and an "OFF" state (S12) are sequentially shifted each time the light control switch 30 is pressed. Among these states, S10 and S12 are the same as those illustrated in FIG. 3. The states at S14 and S16 appear for the first time in FIG. 5.

Figure 6:
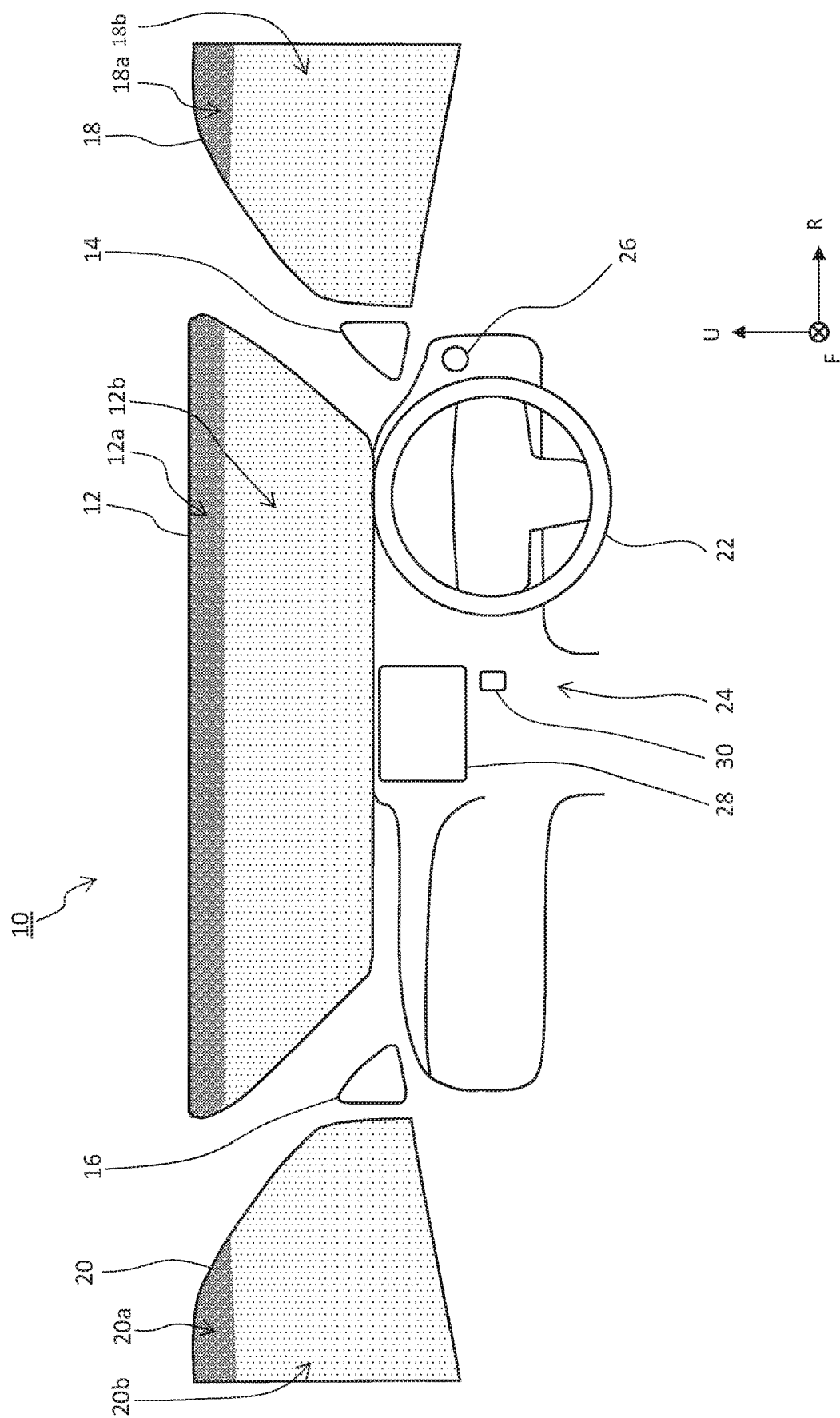
FIG. 6 is a view illustrating a case wherein the transmittance of a non-upper part is slightly reduced.

FIG. 6 is a view schematically illustrating the "ON (upper part, dark/non-upper part, slightly dark)" state (S14). At S14, the transmittance of the upper parts 12a, 18a, and 20a is reduced and these parts become dark, similarly as at S10. Further, at S14, the transmittance of the non-upper parts 12b, 18b, and 20b is slightly reduced and these parts become slightly dark.

Figure 7:
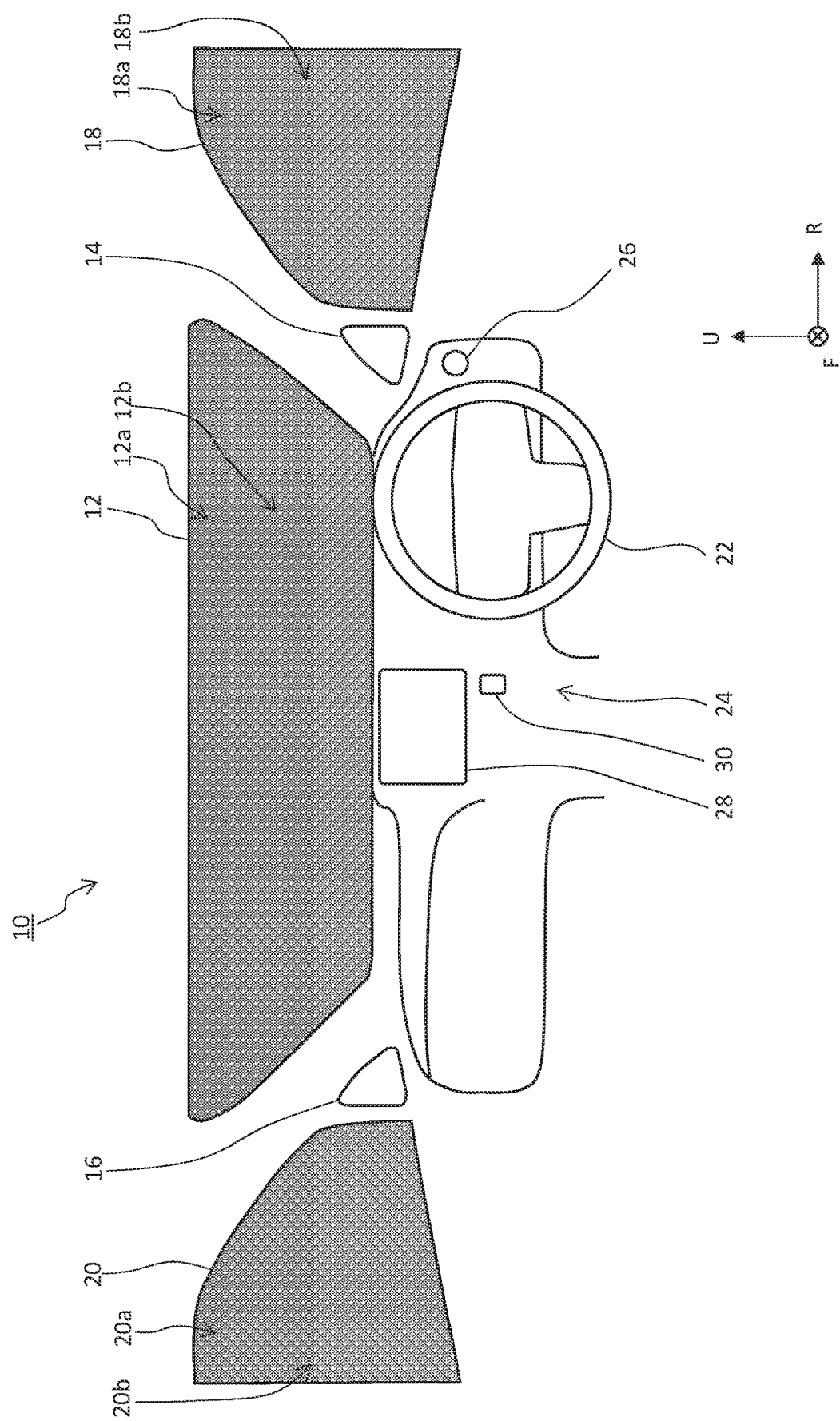
FIG. 7 is a view illustrating a case wherein the transmittances of the upper part and the non-upper part are significantly reduced.

FIG. 7 is a view schematically illustrating the "ON (upper part, dark/non-upper part, dark)" state (S16). At S16, the transmittance of the upper parts 12a, 18a, and 20a is reduced, similarly as at S10. Further, at S16, the transmittance of the non-upper parts 12b, 18b, and 20b is also reduced as much as the transmittance of the upper parts 12a, 18a, and 20a. The light shielding properties of the front windshield 12, the right side windshield 18, and the left side windshield 20, as a whole, are improved and these windshields are darkened.

A driver may stop the vehicle 10 in a parking lot and turn off the power switch 26, for example. The mode changing unit 56 of the controller 50 then switches from the mode in which the vehicle 10 is in a driving state to the mode in which the vehicle 10 is not in a driving state. In this situation, because the driver is not driving the vehicle 10 it is not necessary that they pay attention to the surrounding traffic conditions. As such, it is not necessary for the driver to quickly operate the light control switch 30, and sequentially switches between the states at S10, S14, S16, and S12 illustrated in FIG. 5 to perform a desired setting. The state of S14 illustrated in FIG. 6 may be selected when an occupant wishes view the surroundings while maintaining a certain degree of light shielding property. In addition, the state of S16 illustrated in FIG. 7 may be selected when, for example, it is desired to improve the light shielding property to reduce the direct sunlight in order to inhibit temperature rise inside the vehicle 10.

From another perspective of the embodiment described above, in the mode in which the vehicle 10 is not in a driving state, the upper parts 12a, 18a, and 20a are in a state of being freely selectable in a changeable range between two stages, that is, bright and dark (this range corresponds to first changeable range). Further, in the mode in which the vehicle 10 is not in a driving state, the non-upper part 12b, 18b, and 20b are in a state of being freely selectable in a changeable range between three stages, that is, bright, slightly dark, and dark (this range corresponds to second changeable range). In the mode in which the vehicle 10 is in a driving state, the upper parts 12a, 18a, and 20a are in a state of being freely selectable in the changeable range between two stages, that is, bright and dark (first changeable range described above). However, in the mode in which the vehicle is in a driving state, the state of the non-upper parts 12b, 18b, and 20b is limited to one stage, that is, bright. That is, it can be said that the range that can be selected in the second changeable range is limited to the range in which the transmittance is equal to or higher than the lower limit value described above.

In the embodiment described above, the button light control switch 30 is disposed near the center of the instrument panel 24 in the vehicle width direction. However, the light control switch 30 can be disposed in various manners. For example, the light control switch 30 may be a lever switch that moves in the vertical direction or the like, or may be a rotating knob switch. Instead of the mechanical light control switch 30, the light control switch 30 may be included in the touch panel display 28. Further, the light control switch 30 may be disposed, for example, near the side end of the instrument panel 24 closer to a driver seat, or may be disposed on the ceiling nearly above the driver seat or the ceiling near a rearview mirror (referred to as inner mirror).

Figure 8:
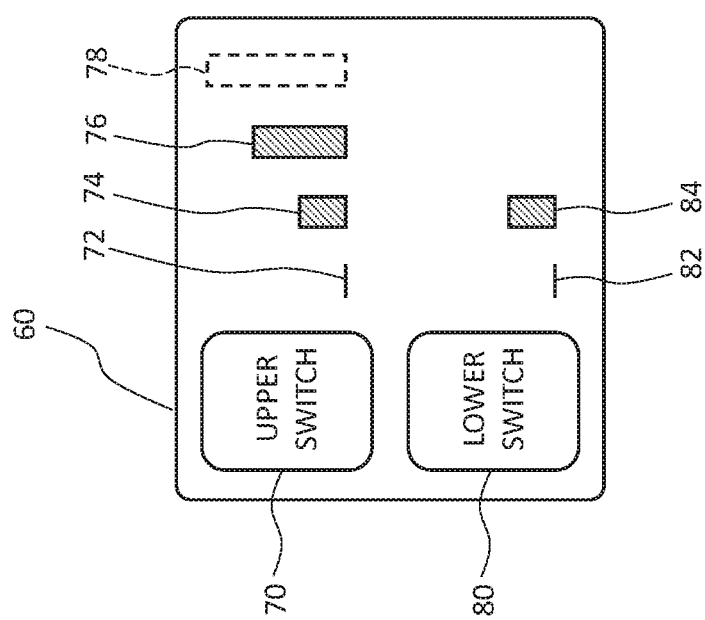
FIG. 8 is a view illustrating a case of another light control switch in a driving state.
Figure 9:
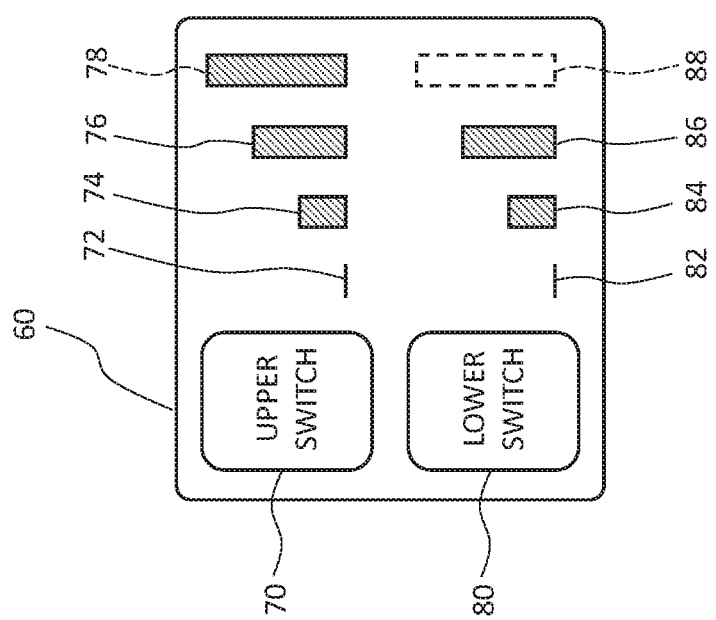
FIG. 9 is a view illustrating a case of another light control switch when the vehicle is not in a driving state.

FIGS. 8 and 9 are views illustrating an example in which a light control switch 60 including a plurality of switches is used instead of the single light control switch 30. FIG. 8 illustrates a case where the vehicle 10 is in a driving state, while FIG. 9 illustrates a case where the vehicle 10 is not in a driving state.

The light control switch 60 includes two mechanical buttons, that is, an upper switch 70 and a lower switch 80. The upper switch 70 is a switch for simultaneously controlling the upper parts 12a, 18a, and 20a in a same manner. Lamp-based indicators 72, 74, 76, and 78 are arranged next to the upper switch 70. The state wherein only the indicator 72 is on is the state in which the upper parts 12a, 18a, and 20a have the highest transmittance (that is, a state wherein no voltage is applied). Further, the state wherein all the indicators 72, 74, 76, and 78 are on is the state in which the upper parts 12a, 18a, and 20a have the lowest transmittance (that is, a state wherein highest voltage is applied). In the example illustrated in FIG. 8, the indicators 72, 74, and 76 are on, which indicates a state wherein the transmittance is higher than the lowest transmittance by one stage. Each time the upper switch 70 is pressed, the transmittance is sequentially switched from the highest transmittance to the lowest transmittance.

The lower switch 80 is a switch for simultaneously controlling the non-upper parts 12b, 18b, and 20b in the same manner. Lamp-based indicators 82 and 84 are arranged next to the lower switch 80. The state wherein only the indicator 82 is on is the state in which the non-upper parts 12b, 18b, and 20b have the highest transmittance (that is, a state wherein no voltage is applied). Further, the state wherein indicators 82 and 84 are on is a state wherein the transmittance is reduced within a range in which the transmittance is not lower than a predetermined value (lower limit value described above) acceptable when the vehicle 10 is in a driving state.

When the vehicle 10 is in a driving state, a driver can change the transmittance of the upper parts 12a, 18a, and 20a by quickly pressing the upper switch 70 once or a plurality of times. In addition, every time the driver presses the lower switch 80, the driver can switch between the state wherein the non-upper parts 12b, 18b, and 20b have the highest transmittance and the state wherein the transmittance of the non-upper parts 12b, 18b, and 20b is slightly lower.

As illustrated in FIG. 9, when the vehicle 10 is not in a driving state, indicators 86 and 88 are newly added next to the lower switch 80. This is because when the vehicle 10 is not in a driving state, it is permitted to reduce the transmittance below the predetermined value that is set when the vehicle 10 is in a driving state. For this reason, in the example illustrated in FIG. 9, the lower switch 80 can be adjusted in four stages, as with the upper switch 70.

When the light control switch 60 illustrated in FIGS. 8 and 9 is adopted, the upper parts 12a, 18a, 20a and the non-upper parts 12b, 18b, 20b can be separately switched in multiple stages. It is thus possible to achieve precise light control according to a user's request.

From another perspective of the embodiment described above, in the mode in which the vehicle 10 is not in a driving state, the upper parts 12a, 18a, and 20a are in a state of being freely selectable in a changeable range between four stages (this range corresponds to first changeable range), and the non-upper parts 12b, 18b, and 20b are also in a state of being freely selectable in a changeable range between four stages (this range corresponds to second changeable range). In the mode in which the vehicle 10 is in a driving state, the upper parts 12a, 18a, and 20a are still in the state of being freely selectable in the changeable range between four stages (first changeable range described above). However, in the mode in which the vehicle is in a driving state, the state of the non-upper parts 12b, 18b, and 20b is limited to two stages. In other words, the range that can be selected in the second changeable range is only the range in which the transmittance is equal to or higher than the lower limit value described above, and change to the range in which the transmittance is lower than the lower limit value is prohibited.

While light control may be executed on the non-upper parts 12b, 18b, and 20b completely independently from the upper parts 12a, 18a, and 20a, the control may be executed with a constraint that the transmittance of the non-upper parts 12b, 18b, and 20b is not lower than that of the upper parts 12a, 18a, and 20a. An example wherein the non-upper parts 12b, 18b, and 20b are controlled to be in a low transmittance state wherein the indicators 82 and 84 are both on will be described as a specific example. In this case, when the upper switch 70 is operated to change the transmittance of the upper parts 12a, 18a, and 20a to the highest transmittance at which only the indicator 72 is on, the transmittance of the non-upper parts 12b, 18b, and 20b is also automatically changed to the highest transmittance at which only the indicator 82 is on.

This example is particularly focused on the control of the lower limit of the transmittance of the non-upper parts 12b, 18b, and 20b in the mode in which the vehicle 10 is in a driving state. In both the mode in which the vehicle 10 is in a driving state and the mode in which the vehicle 10 is not in a driving state, the upper parts 12a, 18a, and 20a and the non-upper parts 12b, 28b, and 20b can have the highest transmittance at which no voltage is applied. However, the upper limit of the transmittance of one or both of the upper part 12a, 18a, 20a and the non-upper part 12b, 28b, 20b may be limited within an acceptable range in one or both of the mode in which the vehicle 10 is in a driving state and the mode in which the vehicle 10 is not in a driving state. For example, the upper limit of the transmittance of both the upper part 12a, 18a, 20a and the non-upper part 12b, 28b, 20b may be set to about 80% to 90% when a vehicle is not in a driving state.

In the embodiment described above, light control is executed simultaneously on the front windshield 12, the right side windshield 18, and the left side windshield 20 in the same manner. This simplifies the operation of a driver. However, it is also possible to execute the light control separately on the front windshield 12, the right side windshield 18, and the left side windshield 20. Alternatively, as described next with reference to FIG. 10, the light control of the front windshield 12 and the light control of the right side windshield 18 and the left side windshield 20 may be executed separately, and the light control of the right side windshield 18 and the light control of the left side windshield 20 may be executed simultaneously and in a same manner.

Figure 10:
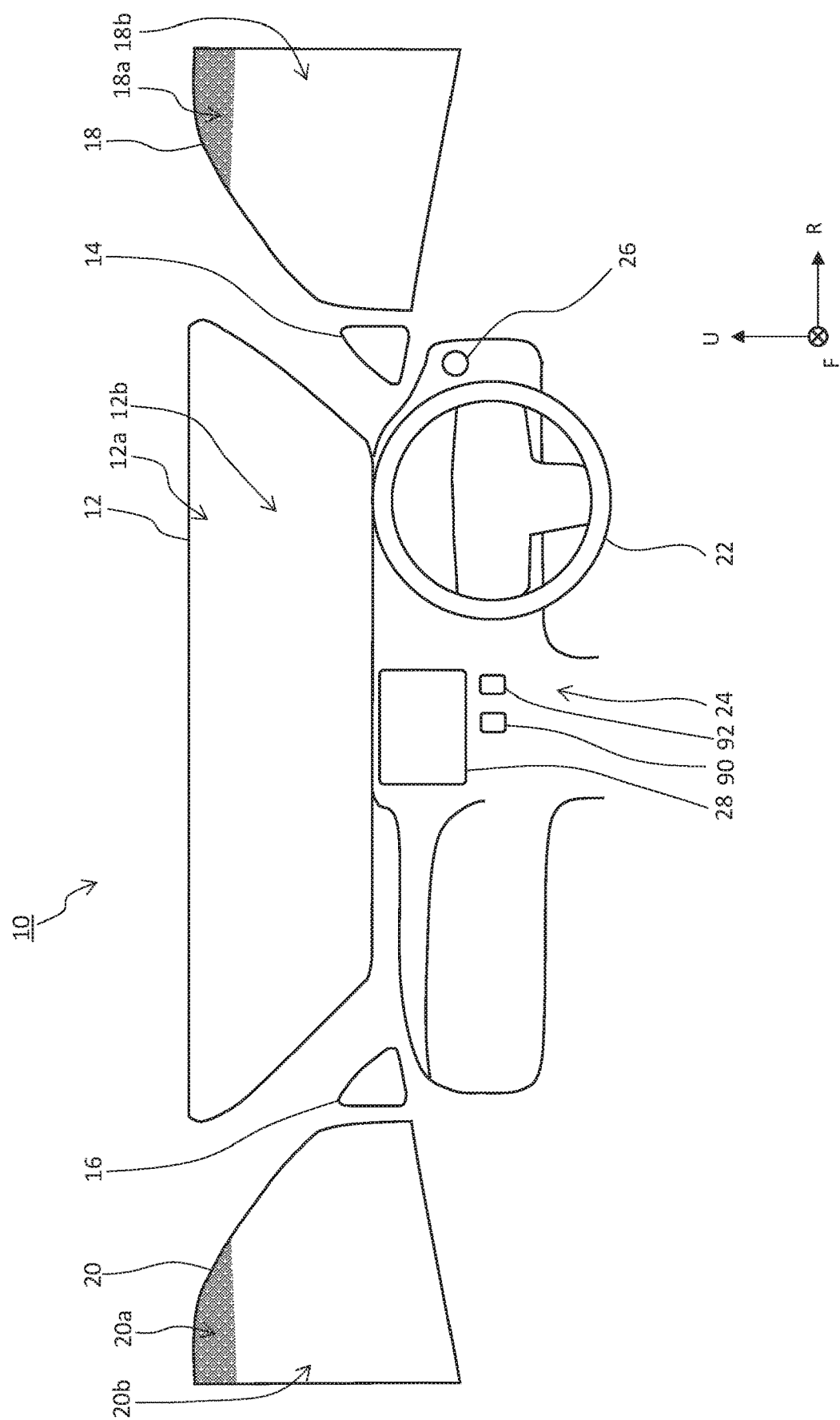
FIG. 10 is a view illustrating an aspect of introducing yet another light control switch.

In FIG. 10, light control switches 90 and 92 attached to the instrument panel 24 function in place of the light control switch 30. The light control switch 90 is a switch for operating the front windshield 12. The light control switch 92 is a switch for simultaneously operating the right side windshield 18 and the left side windshield 20 in a same manner. In the example illustrated in FIG. 10, the upper part 12a of the front windshield 12 is set to have the highest transmittance, while changes are made to reduce the transmittance of the upper part 18a of the right side windshield 18 and the upper part 20a of the left side windshield 20. As described above, by executing the light control of the front windshield 12 and the light control of the right side windshield 18 and the left side windshield 20 separately, precise adjustments can be made to accommodate both situations when sunlight enters from the front and when the sunlight enters from the side.

The aspect of separately executing the light control of the front windshield 12 and the light control of the right side windshield 18 and the left side windshield 20 may be implemented only when a vehicle is not in a driving state. In such an example, when the vehicle is in a driving state, when either of the light control switches 90 and 92 is operated, light control is executed simultaneously on the front windshield 12, and the right side windshield 18 and the left side windshield 20 in the same manner, while, when the vehicle is not in a driving state, the transmittance of the front windshield 12 is controlled by the light control switch 90, and the transmittance of the right side windshield 18 and the left side windshield 20 is controlled by the light control switch 92, as described above.

In the above description, the front windshield 12, the right side windshield 18, and the left side windshield 20 are each divided into two parts, that is, the upper part 12a, 18a, 20a and the non-upper part 12b, 18b, 20b, and the same light control is executed on these two parts. However, the light control of the upper parts 12a, 18a, and 20a may be different from the light control of the non-upper parts 12b, 18b, and 20b. Examples include an aspect of reducing the light transmittance toward the upper side and an aspect of reducing the light transmittance of a portion located between the face of a driver or a passenger and the sun as compared with the transmittances of the surrounding portions.

The above description does not refer to control of either a side windshield or a rear windshield on the rear side. While use of a light-controllable member for the side windshield or the rear windshield on the rear side is not necessary, it is obvious that a light-controllable member may be used for either or both. When a light-controllable member is used, control of one or both of the side windshield and the rear windshield on the rear side may be executed simultaneously and in the same manner as the control of one or both of the front windshield 12 and the right side windshield 18, or may be executed separately.

In addition, the right front triangular window 14 or the left front triangular window 16 can also be formed using the light-controllable member. With such a configuration, transmittance control on the right front triangular window 14 and the left front triangular window 16 may be executed simultaneously and in the same manner as the non-upper part 18b of the right side windshield 18 and the non-upper part 20b of the left side windshield 20, respectively.

The invention claimed is:

1. A light control system for a windshield comprising:
a windshield of a vehicle, the windshield being capable of changing a visible light transmittance of an upper part and a non-upper part; and
a controller that controls a change of the visible light transmittance, wherein
when the vehicle is not in a driving state, the controller permits a change of reducing the visible light transmittance of the upper part and the non-upper part to be lower than a predetermined value,
when the vehicle is in a driving state, the controller controls the visible light transmittance of the upper part to be freely selectable in a first changeable range that is set in advance and includes a visible light transmittance lower than the predetermined value, and controls the visible light transmittance of the non-upper part to be selectable only in a range having a visible light transmittance equal to or higher than the predetermined value within a second changeable range that is set in advance and includes a visible light transmittance lower than the predetermined value, and
when the vehicle is in the driving state, the controller permits a change of reducing the visible light transmittance of the upper part to be lower than the predetermined value and prohibits a change of reducing the visible light transmittance of the non-upper part to be lower than the predetermined value.

2. The light control system for a windshield according to claim 1, wherein
when the vehicle is not in a driving state, the controller controls the visible light transmittance of the upper part to be freely selectable in the first changeable range, and controls the visible light transmittance of the non-upper part to be freely selectable in the second changeable range.

3. The light control system for a windshield according to claim 1, wherein
the windshield is a front windshield disposed on front of the vehicle, and
the upper part is set to be outside a range of a field of view necessary for a driver of the vehicle to check a traffic condition.

4. The light control system for a windshield according to claim 3, wherein
the upper part is set as an area within 20% of a height of the front windshield.

5. The light control system for a windshield according to claim 1, wherein
the predetermined value is set in a range in which the visible light transmittance is equal to or higher than 70%.

6. The light control system for a windshield according to claim 1, wherein
the vehicle not being in a driving state includes when the vehicle is in a state wherein an ignition switch or a power switch that activates the vehicle is turned off.

7. The light control system for a windshield according to claim 1, wherein
the vehicle is capable of traveling in an automatic driving mode,
the vehicle not being in a driving state includes a state wherein the vehicle is traveling in a non-automatic driving mode, and
the vehicle not being in a driving state includes a state wherein the vehicle is traveling in the automatic driving mode.

8. The light control system for a windshield according to claim 1, wherein
the controller includes a storage unit having a plurality of pieces of light control data, detects a number of times that a single light control switch is operated by a user, reads the light control data from the storage unit, and changes the visible light transmittance in the upper part and the non-upper part.

9. A light control system for a windshield comprising:
a windshield of a vehicle, the windshield being capable of changing a visible light transmittance of an upper part and a non-upper part; and
a controller that controls a change of the visible light transmittance, wherein
when the vehicle is not in a driving state, the controller permits a change of reducing the visible light transmittance of the upper part and the non-upper part to be lower than a predetermined value,
when the vehicle is in a driving state, the controller permits a change of reducing the visible light transmittance of the upper part to be lower than the predetermined value and prohibits a change of reducing the visible light transmittance of the non-upper part to be lower than the predetermined value,
the vehicle is capable of traveling in an automatic driving mode,
the vehicle not being in the driving state includes a state wherein the vehicle is traveling in a non-automatic driving mode, and
the vehicle not being in the driving state includes a state wherein the vehicle is traveling in the automatic driving mode.

* * * * *